United States Patent
Dave et al.

(10) Patent No.: US 7,067,214 B2
(45) Date of Patent: Jun. 27, 2006

(54) PEM FUEL CELL STACK ASSEMBLY WITH ISOLATED INTERNAL COOLANT MANIFOLD

(75) Inventors: Nileshkumar T. Dave, West Hartford, CT (US); Jeremy P. Meyers, West Hartford, CT (US); David A. Niezelski, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 354 days.

(21) Appl. No.: 10/694,694

(22) Filed: Oct. 27, 2003

(65) Prior Publication Data

US 2005/0089737 A1    Apr. 28, 2005

(51) Int. Cl.
*H01M 2/08* (2006.01)
*H01M 8/04* (2006.01)
*H01M 8/10* (2006.01)

(52) U.S. Cl. .............................. 429/35; 26/30
(58) Field of Classification Search ................ 429/35, 429/26, 38, 32
See application file for complete search history.

(56) References Cited

U.S. PATENT DOCUMENTS

| | | | | |
|---|---|---|---|---|
| 3,436,522 A | * | 4/1969 | Carkhuff et al. | 219/137.42 |
| 4,508,793 A | * | 4/1985 | Kumata et al. | 429/26 |
| 5,229,575 A | * | 7/1993 | Waller et al. | 219/233 |
| 5,433,166 A | * | 7/1995 | Donatello et al. | 116/202 |
| 6,162,298 A | * | 12/2000 | Rudolph | 118/715 |
| 6,572,995 B1 | * | 6/2003 | Yang et al. | 429/26 |

* cited by examiner

*Primary Examiner*—Patrick Joseph Ryan
*Assistant Examiner*—Thomas H. Parsons
(74) *Attorney, Agent, or Firm*—M. P. Williams

(57) ABSTRACT

A PEM fuel cell assembly includes cooler plates (10) with internal coolant manifolds (25) isolated from the cell stack assembly by an isolation gap (28) to minimize the risk of contamination of the cells by antifreeze. The internal coolant manifolds are formed by seal assemblies (24), each disposed between inlet or outlet openings (14, 15) in projections (16) of each cooler plate extending outwardly from the fuel cell planform (20) to provide a gap (28), which may be used as an air turn manifold. Flanges (40) with through holes (41) may receive tie rods to assist assembly of a fuel cell stack with the cooler plate.

8 Claims, 4 Drawing Sheets

PEM FUEL CELL STACK ASSEMBLY WITH ISOLATED INTERNAL COOLANT MANIFOLD

TECHNICAL FIELD

The present invention relates to coolant manifolds in a PEM fuel cell assembly formed in projections of the cooler plates extending outwardly from the planform of the fuel cells.

BACKGROUND ART

In a proton exchange membrane (PEM) fuel cell, hydrogen fuel is supplied to a negative electrode (anode) where it catalytically dissociates into protons and electrons according to the oxidation reaction $H_2 \rightarrow 2H^+ + 2e^-$. The protons ($H^+$) pass through a membrane electrolyte to a positive electrode (cathode) while the electrons ($e^-$) are conducted through an external path creating an electric current between the anode and cathode through an external load. At the cathode the protons and electrons recombine in the presence of oxygen to form water according the reduction reaction: $O_2 + 4e^- + 4H+ \rightarrow 2H_2O$. The by-products of the PEM fuel cell reaction are water and heat; the heat requiring that the fuel cell be cooled to maintain an acceptable internal temperature.

A single fuel cell includes a membrane electrode assembly (MEA), —comprising the membrane electrolyte interposed between a pair of electrodes (anode and cathode), —and, adjacent each electrode opposite the membrane electrolyte, an electrically conductive plate that defines the reactant gas flow fields. The gas diffusion plates direct the reactant gases to their respective electrodes, namely, hydrogen fuel to the anode and oxidant to the cathode, and also transport the water byproduct away from the cell.

In order to generate the voltage needed for a given application, many such fuel cells are electrically connected in series and stacked together to form a cell stack assembly (CSA). Sealed to the cell stack assembly are opposed pairs of external manifolds for distributing reactant and exhaust gases (hydrogen and oxidant) to and from the anode and cathode flow fields. The external manifolds may comprise a fuel input/output manifold opposite a fuel turn manifold and an air input/output manifold opposite an air turn manifold, for example. Fuel cell configurations with internal fuel and air manifolds are known.

To absorb the heat generated by the exothermic reaction of fuel and oxygen within the fuel cell, solid cooler plates with interior coolant channels are typically disposed between every two to four fuel cells of the CSA. FIG. 1 represents a typical prior art cooler plate 210 in which a coolant traverses a plurality of coolant fluid flow channels 262 to transfer heat away from the cells. Coolant fluid flow channels 262 communicate with a coolant manifold via inlet and outlet openings 248 and 250 respectively. Fuel inlet and outlet openings (244 and 246 respectively) and oxidant inlet and outlet openings (240 and 242 respectively) communicate with external reactant gas manifolds. Interfacial seals 264 circumscribe the reactant manifold openings (240, 242, 244 and 246) to isolate the central, coolant flow field portion of plate 210 from the reactant streams flowing through the reactant manifolds and CSA flow fields.

Unlike the reactant gas manifolds, which may be internal or external, the coolant manifold for a PEM fuel cell assembly is typically an internal manifold, i.e., it is disposed within the body of the cell stack assembly. Although external coolant manifolds have been used with phosphoric acid fuel cells, as shown in commonly owned U.S. Pat. No. 3,969,145, for example, they are generally not suitable for PEM fuel cells because of the smaller cell area and thinner cell components of the PEM fuel cells compared to phosphoric acid and other types of fuel cells. A disadvantage of an internal manifold, however, is that it reduces the active area ratio and therefore the power density of the cell stack assembly.

For automotive or vehicular applications in which fuel cell power plants must operate in subfreezing temperatures it is highly desirable to use an antifreeze solution as the coolant, which poses another problem for PEM fuel cells. Antifreeze is a poison to the fuel cell catalysts and must not be allowed to come in contact with the cells. The cooler plates and coolant manifold seals must be impervious to the antifreeze solution. This problem was typically addressed in the prior art by implementing both interfacial seals 264 (FIG. 1) and edge seals in plane with, and circumscribing the cells to prevent contamination. Reliable seals, however, are both difficult and expensive to achieve.

DISCLOSURE OF INVENTION

Objects of the invention include isolating the coolant loop to minimize the risk of coolant contamination and maximize the active area of the cell stack assembly; eliminating the coolant edge seals, providing improved structural stability of the cell stack assembly; and providing a lower cost and more reliable manifold seal.

According to the present invention, a fuel cell assembly includes at least one fuel cell interposed between a pair of cooler plates, each cooler plate having a coolant inlet and coolant outlet opening in fluid communication with a coolant manifold. Inlet and outlet openings are respectively disposed in inlet and outlet projections extending from the planform of the fuel cells, such that an isolation gap is provided between the planform of the cell and the coolant manifold. The coolant manifold is formed by a seal assembly disposed between corresponding projections of proximate cooler plates to permit coolant flow between cooler plates.

Other objects, features and advantages of the present invention will become more apparent in the light of the following detailed description of exemplary embodiments thereof, as illustrated in the accompanying drawings.

MODE(S) FOR CARRYING OUT THE INVENTION

Figure 1:
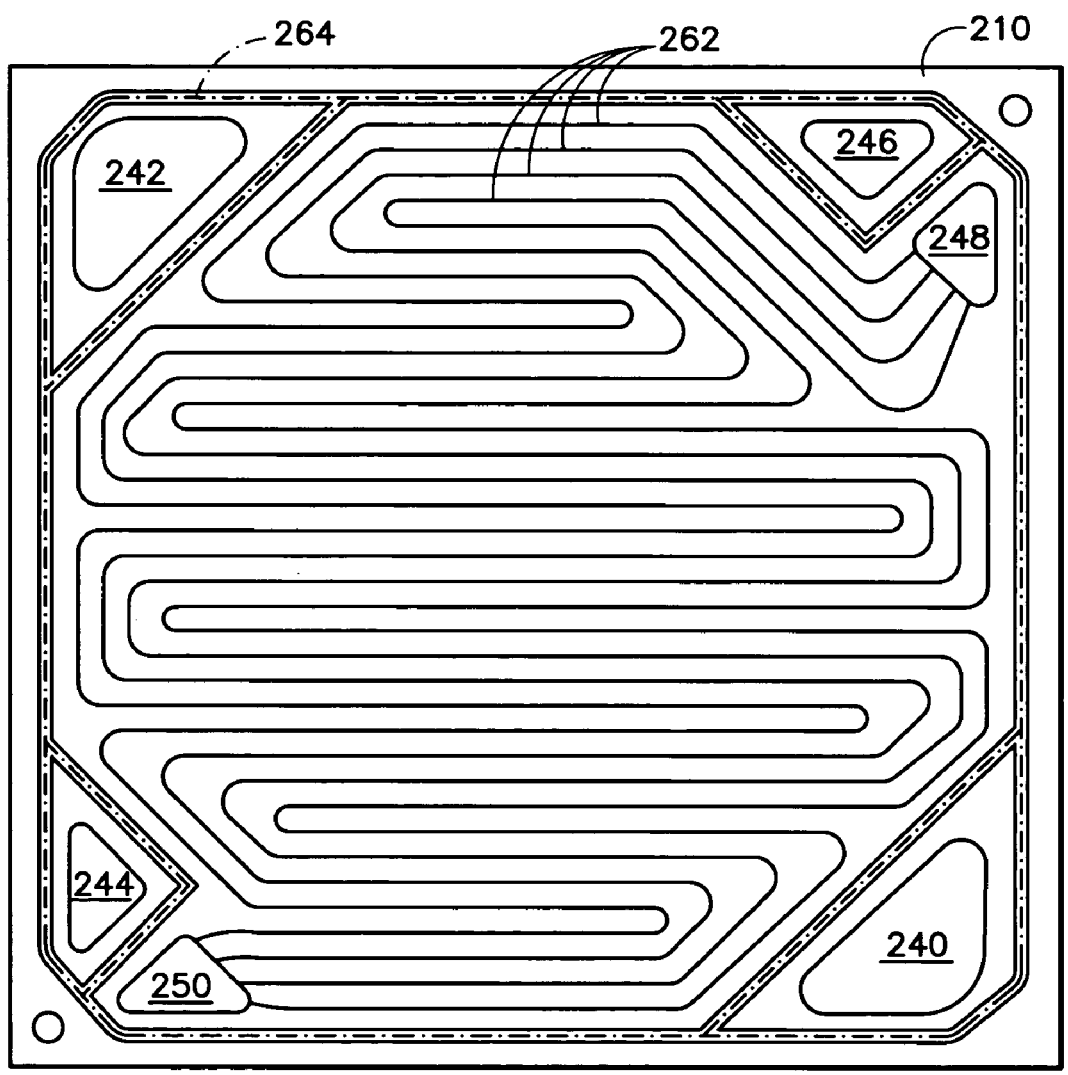
FIG. 1 is a plan view of a prior art cooler plate.
Figure 2:
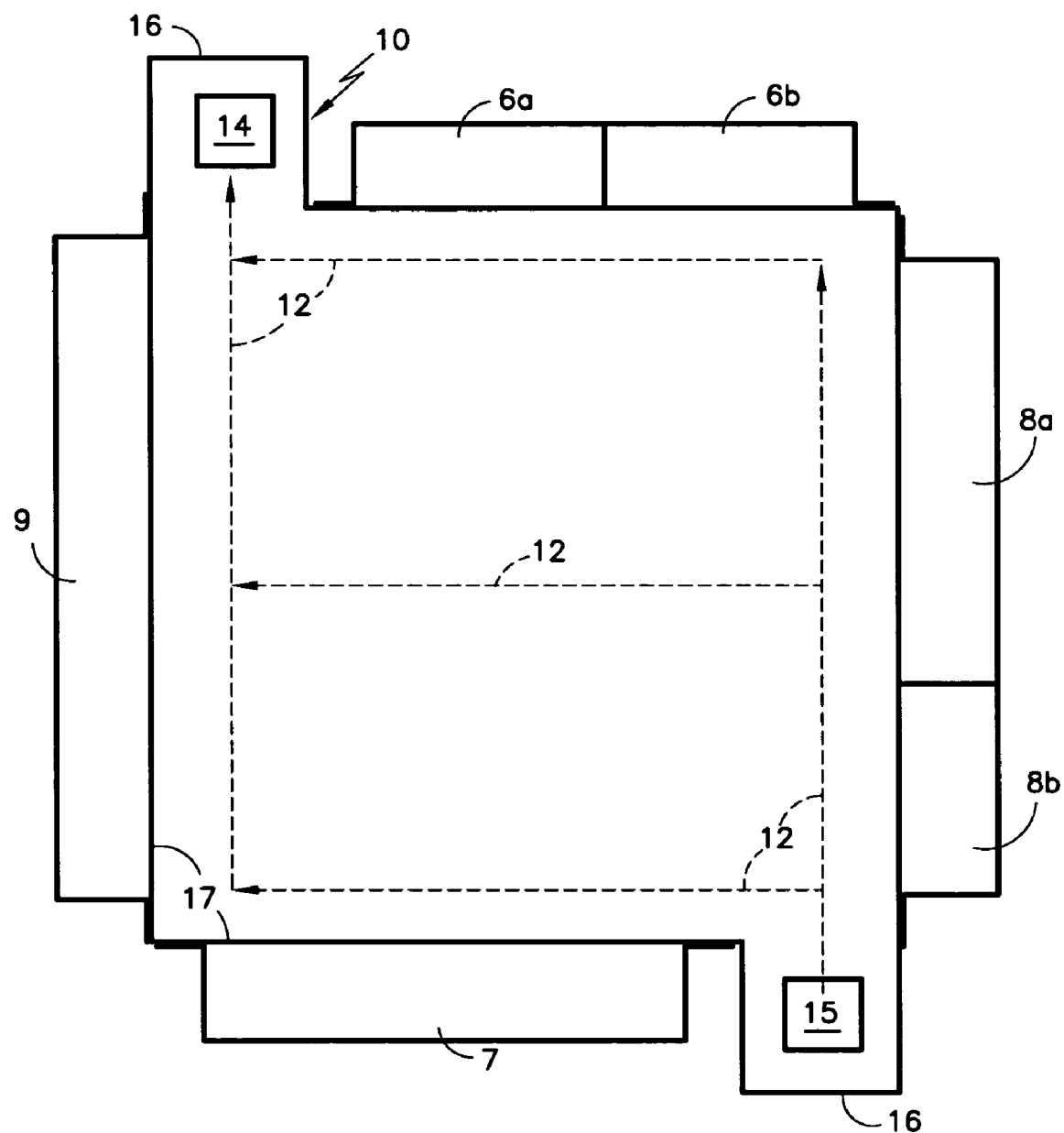
FIG. 2 is a plan view of a first embodiment of the cooler plate of the present invention.

Referring to FIG. 2, an air inlet manifold 6a and an air outlet manifold 6b may be opposite an air turn manifold 7 and a fuel inlet manifold 8a and fuel outlet manifold 8b may be opposite a fuel turn manifold 9. In FIG. 2, a fuel cell assembly of the present invention includes a cooler plate 10 having a plurality of interior coolant channels 12 in fluid communication with coolant manifolds via inlet and outlet openings 14 and 15 respectively, disposed within projections 16 of the cooler plate 10 that extend beyond the planform 17 of the fuel cells. The cooler plate 10 may be made of metal or graphite or other suitable electrically conductive material.

Figure 3:
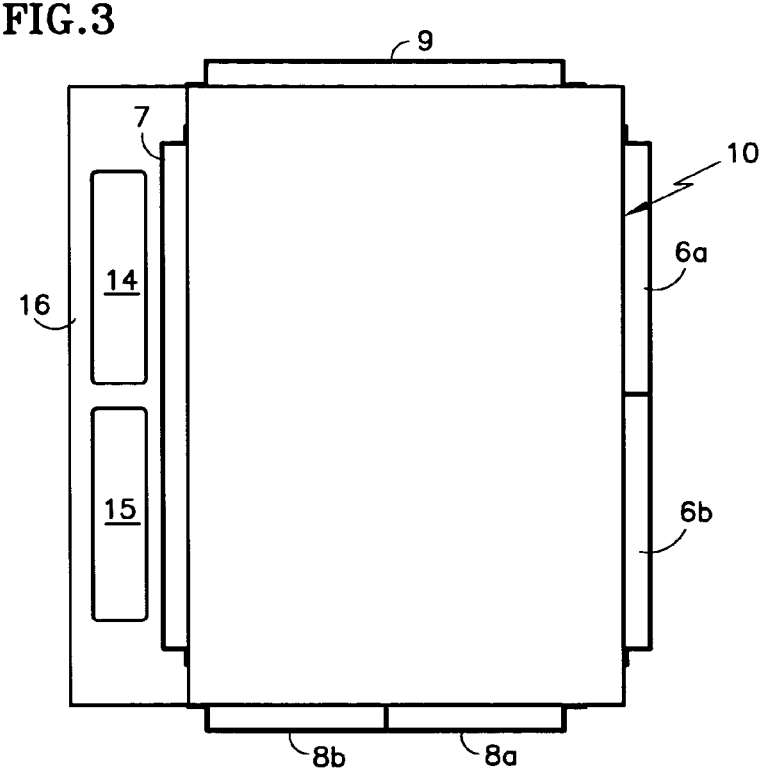
FIG. 3 is a plan view of an embodiment of the cooler plate having projections on the same side.

Projections 16 for coolant inlet and outlet openings 14, 15 may be on opposite sides of the cooler plate as shown in FIG. 2 or, alternatively, they may both be disposed on the same side of the cell stack assembly, as shown in FIG. 3. In either case it is preferable for the coolant inlet and outlet openings 14, 15 to be adjacent an air manifold (either an air inlet/outlet manifold 6a, 6b or air turn manifold 7, for example) so that any gas leakage into the coolant, assuming the coolant pressure is below the reactant pressures, will be air.

Figure 4:
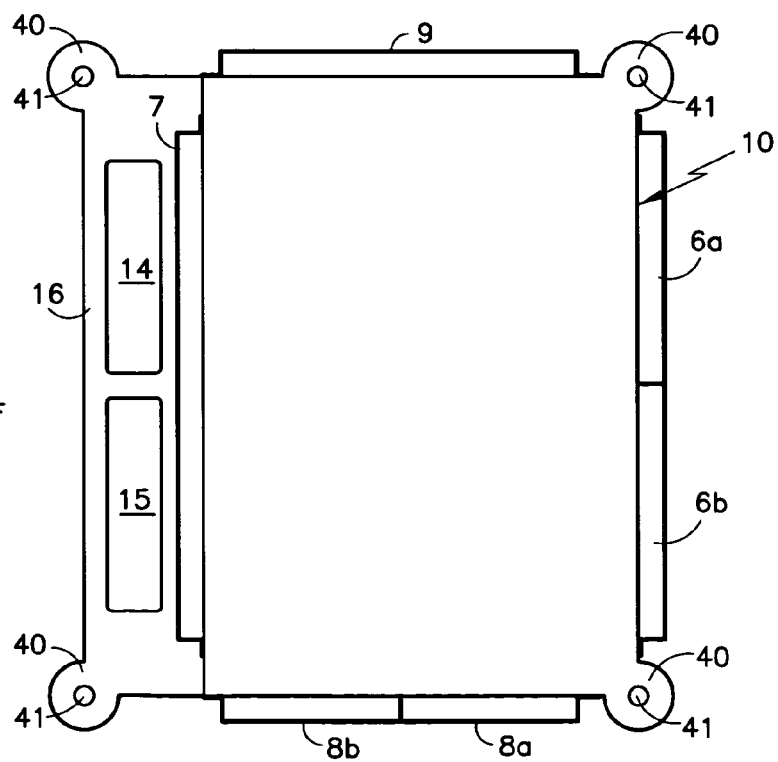
FIG. 4 is a plan view of an embodiment of the cooler plate used as a structural tie.

Referring to FIG. 4, in yet another embodiment of the present invention, the cooler plate 10 may function as a structural tie to improve uniform loading, and thus performance and sealing of the cell stack assembly. As shown in FIG. 4, the cooler plate 10 includes flanges 40 with throughholes 41 for attachment of the cooler plate to the pressure plates (not shown) located at the ends of the cell stack assembly. The cell stack assembly is held in compression by tie rods which pass through the pressure plates and then through the throughholes 41 of the cooler plates.

Figure 5:
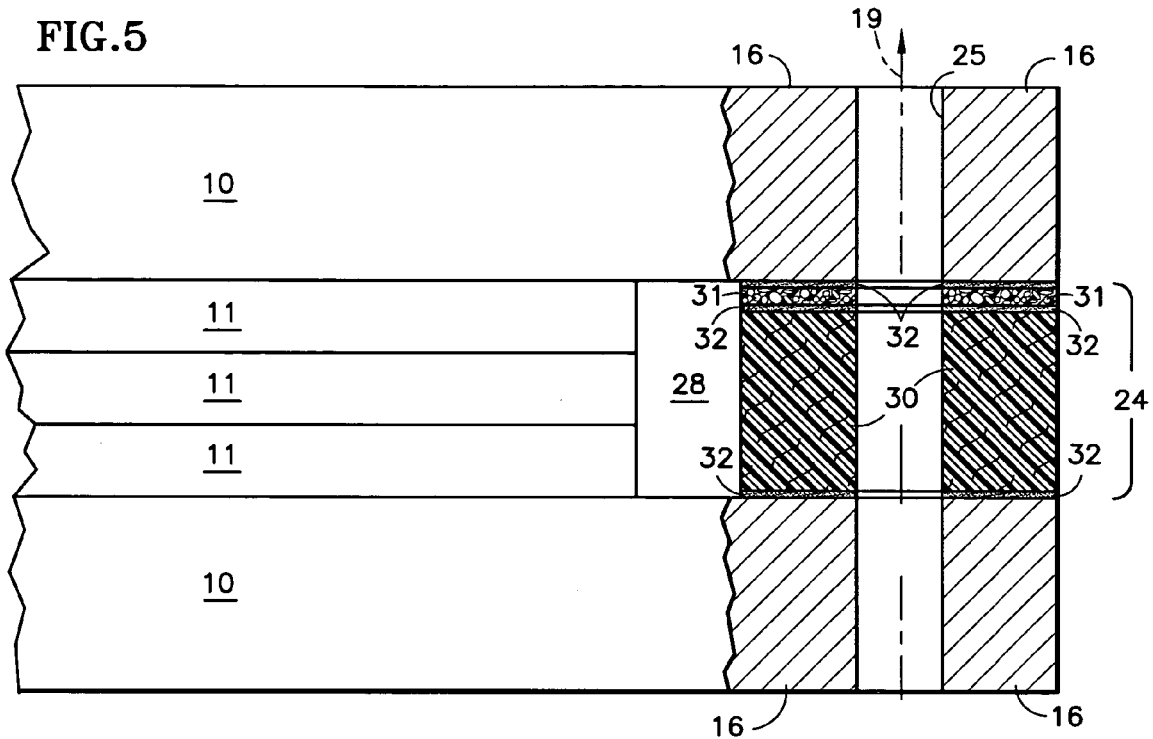
FIG. 5 is a cross-sectional view of a first embodiment of the cell stack assembly of the present invention.

As shown in cross section in FIG. 5, a seal assembly 24 disposed between corresponding projections 16 of proximate cooler plates 10 is dimensioned according to the number of intervening fuel cells 11 to form a coolant manifold 25 isolated from the cells by an isolation gap 28.

In the example shown in FIG. 5, there are three cells 11 between proximate cooler plates 10, but the number of cells between cooler plates may vary depending on the application. Each cell 11 comprises a membrane electrode assembly MEA sandwiched between a pair of reactant flow field plates.

The isolation gap 28 between the cells 11 and the coolant manifold 25 minimizes the risk of coolant contamination of the cells as coolant flows through the coolant manifold 25 in the direction of arrow 19. Such a configuration isolates the coolant from the cell and eliminates the need for coolant edge seals within the cell, but edge seals are still required within the cell to contain the reactants. In one embodiment the gap, or space between the edge of the cell and the coolant manifolds, functions as an air turn manifold. Moreover, the pressure differential across the coolant manifold of the present invention is lower than in conventional internal manifolds since the pressurized reactant does not come in contact with the coolant manifold seal.

Referring to FIG. 5, the seal assembly 24 may include a solid bushing 30 bonded to one surface of a cooler plate projection 16, and a closed cell foam gasket 31 adhered by bonds 32 on one side to the bushing 30 and on the opposite side to a corresponding projection of a second cooler plate 16, preferably with a cross linkable rubber such as room temperature vulcanizing (RTV) silicone rubber.

The bushing 30 may be a glass reinforced thermoset plastic such as fiberglass and a phenolic or epoxy resin. Alternatively, it may be made from a creep resistant thermoplastic such as a polyethermide or polyimide. The bushing 30 may also be an elastomeric rubber molded to the cooler plates.

The bonds 32 may be made from a thermoplastic or thermoset resin. Exemplary thermoplastic resins include polyethylene and polyvinylidene fluoride. Suitable thermoset resins or elastomers include epoxy, and phenolic or silicone rubber polymers such as RTV.

The gasket 31 may be a closed cell foam, such as the silicone foam or, alternatively, it may be a solid rubber. If desired in any embodiment, surfaces of the projections 16 may include a groove for constraining the gasket 31.

Figure 6:
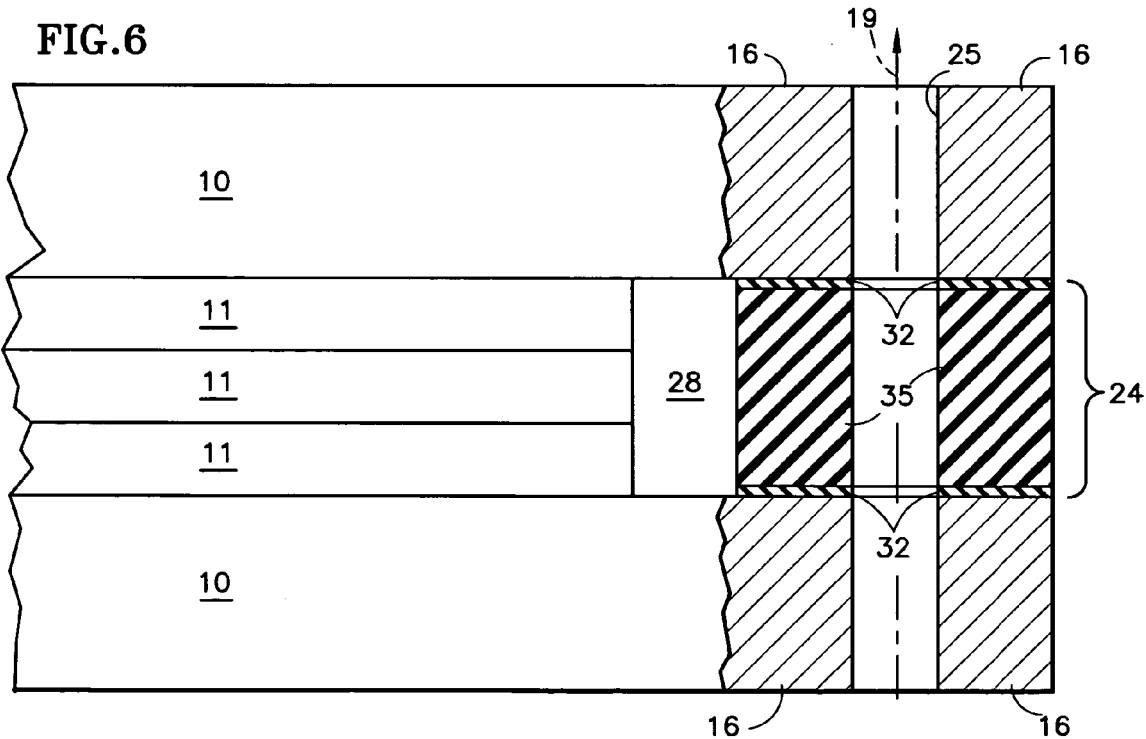
FIG. 6 is a cross-sectional view of a second embodiment of the cell stack assembly of the present invention.

Referring to FIG. 6, in another embodiment, the seal assembly 24 includes a solid or closed cell rubber seal 35, bonded at 32 with a cross-linkable rubber such as RTV to the surfaces of projections 16. Surfaces of projections 16 may have protrusions (not shown) to increase the sealing load, if desired.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell assembly comprising:
a plurality of PEM fuel cells connected electrically in series, each of said fuel cells having substantially the same planforms;
a plurality of cooler plates interposed between groups of said fuel cells;
each of said cooler plates having an internal coolant flow channel in fluid communication with an inlet opening and an outlet opening disposed in one or more projections of said cooler plate and perpendicular to said cooler plate, said projections extending outwardly from said planforms of the fuel cells; and
a plurality of seal assemblies, each disposed between corresponding projections of proximate cooler plates and having a fluid passageway in fluid communication with respective ones of said inlet and outlet openings to form inlet and outlet manifolds to permit coolant flow between cooler plates.

2. A fuel cell assembly as in claim 1 wherein:
each of said seal assemblies includes a closed cell rubber gasket.

3. A fuel cell assembly as in claim 1 wherein:
each of said seal assemblies includes a solid bushing bonded to a gasket.

4. A fuel cell assembly as in claim 3 wherein:
each of said bushings is a glass reinforced plastic.

5. A fuel cell assembly as in claim 3 wherein:
each of said bushings is a creep resistant plastic.

6. A fuel cell assembly as in claim 1 wherein:
each of said cooler plates includes a flange for attachment of the cooler plate to said fuel cell assembly.

7. A fuel assembly as in claim 1 wherein:
said projections extend sufficiently outward from said planforms to provide an isolation gap between said manifold and said planform.

8. A fuel assembly as in claim 7 wherein:
said isolation gap comprises an air turn manifold.

* * * * *